United States Patent [19]  [11] Patent Number: 4,553,216
Stevens et al.  [45] Date of Patent: Nov. 12, 1985

[54] LIQUID STORAGE GAUGING METHOD AND APPARATUS

[75] Inventors: Glenn G. Stevens; Roger C. Kennedy, both of Seattle, Wash.

[73] Assignee: The Boeing Company, Seattle, Wash.

[21] Appl. No.: 452,966

[22] Filed: Dec. 27, 1982

[51] Int. Cl.$^4$ ............................................. G01F 23/26
[52] U.S. Cl. ..................................... 364/558; 364/424
[58] Field of Search ...................... 364/558, 509, 424; 73/301, 304 C, 149

[56] References Cited

U.S. PATENT DOCUMENTS

| | | |
|---|---|---|
| 2,388,559 | 11/1945 | Macintyre . |
| 3,237,451 | 3/1966 | Haeff . |
| 3,358,509 | 12/1967 | Edwards et al. . |
| 3,361,897 | 1/1968 | Rush . |
| 3,439,539 | 4/1969 | Pallis . |
| 3,447,374 | 6/1969 | Cohn et al. . |
| 3,523,186 | 8/1970 | Cohn et al. . |
| 3,596,510 | 8/1971 | Paine . |
| 3,623,366 | 11/1971 | Rowell . |
| 3,640,134 | 2/1972 | Hop . |
| 3,745,338 | 7/1973 | Joyce . |
| 4,019,034 | 4/1977 | Blom et al. . |
| 4,090,408 | 5/1978 | Hedrick ............................ 364/509 X |
| 4,207,766 | 6/1980 | Ruben et al. . |
| 4,218,744 | 8/1980 | Pratt et al. . |
| 4,258,422 | 3/1981 | Dougherty et al. ............. 364/509 X |
| 4,275,382 | 6/1981 | Jannotta ........................... 364/509 X |
| 4,441,157 | 4/1984 | Gerchman et al. .............. 364/509 X |
| 4,451,894 | 5/1984 | Dougherty et al. ................ 364/509 |
| 4,471,656 | 9/1984 | Sanders et al. ................... 364/509 X |

Primary Examiner—Edward J. Wise
Attorney, Agent, or Firm—Christensen, O'Connor, Johnson & Kindness

[57] ABSTRACT

The density, volume and mass of fuel held in an aircraft tank are measured by a system of four pressure sensors interfaced with an associated microcomputer. The sensors are disposed in a predetermined array at unequal depths below the surface plane of the contained fuel. Electrical transducers associated with the pressure sensors develop electrical signals representing the associated pressures P1, P2, P3, and P4 and these signals are processed by the microcomputer which is programmed to correlate the individual pressure signals and known coordinate locations of the sensors with certain unknown parameters including the fuel density $\rho$, and the orientation and distance of the fuel surface plane relative to each pressure sensor. These relationships establish four simultaneous equations that are processed by the programmed microcomputer to yield simultaneous solutions for the density $\rho$, and for the position of the fuel surface plane. Further processing by the programmed microcomputer of the signals representing the position of the surface plane yields output data signals representing the volume of the fuel, i.e., that which fills the tank up to the now-determined plane of the fuel surface level. Thereafter the previously measured density $\rho$ is automatically multiplied in the microcomputer by the determined volume of fuel to yield data signals representing the fuel mass. The resulting signals for the density $\rho$, volume V and mass M of the fuel are displayed on readout devices responsive to output signals from the microcomputer. In an alternative embodiment, a system of three pressure sensors is employed in a similar manner to produce information signals representing volume V and mass M of the fuel when the density $\rho$ is either known or assumed.

14 Claims, 9 Drawing Figures $d_1 \neq d_2 \neq d_3 \neq d_4$
S1 LOCATED AT X=0, Z=0, Y=0

TANK VOLUME SEPARATED INTO PYRAMIDS

LIQUID STORAGE GAUGING METHOD AND APPARATUS

BACKGROUND

The invention generally relates to liquid gauging systems, and it more particularly pertains to method and apparatus for measuring the density, volume and/or mass of fuel contained in a partially filled tank such as an aircraft aviation fuel tank.

While the invention disclosed hereinafter has general application to the technology of liquid gauging, the preferred embodiment of the invention concerns the problems and requirements that are present in measuring fuel contained in aircraft tanks. Aviation fuel tanks are of varied and complex shape and are generally mounted in the wings and fuselage with the shape of the tank being dictated by the profile of the aircraft structure. The irregular geometry of the tanks and the different attitudes that can be assumed by the aircraft at any given instant that the fuel level is monitored, are factors that contribute to the difficulty of accurately measuring the remaining quantity of fuel. Additionally, the aircraft tanks are routinely filled from a variety of aviation fuel sources, and the density of fuel from these different sources can and typically does vary widely. Since the fuel density is related to the energy content in any given unit volume of fuel, it is important to know not only the volume of the remaining fuel but also its density and hence mass or energy content, thus adding an additional design complication to the developement of suitable gauging instrumentation.

One of the more common fuel metering systems uses a plurality of electrical capacitance sensors. Each such sensor comprises a cylindrical open pipe disposed vertically in the tank and surrounding a coaxial center conductor. An AC electrical signal is applied across the outer pipe and center conductor. The fuel fills the space between the inner wall of the cylindrical pipe and the center conductor to the surrounding level of fuel in the tank, thus providing a different (larger) dielectric constant for the portion of the sensor that is submerged below the fuel level compared to the unsubmerged portion, where the dielectric constant of air causes a lower effective dielectric. The plurality of sensors in a given tank are wired in parallel to sum the overall capacitances and this sum is then correlated to the total fuel content. Usually the capacitance sensors are tailored to a particular tank geometry by shaping the inner center conductor, although such shaping does not always precisely match the sensor output to the content of the remaining fuel. Furthermore, such capacitance sensors are usually not augmented with devices for measuring the density of the fuel and hence deviations in the mass (energy content) of the fuel due to variations in density are not measured. Rather, an average fuel density is assumed or estimated and that value is used to compute the mass of the fuel.

The capacitance-type sensors are frequently impaired by corrosion, microbe growth and other contaminants present in the fuel which introduce deviations in the dielectric constant and hence in the measurement performed by the sensor. Electromagnetic interference may also cause the capacitance sensors to deviate from a true fuel content measurement. Different pitch and roll attitudes of the aircraft introduce variations between the actual remaining fuel content and the amount of fuel as measured by capacitance sensors and the relations between various attitudes and fuel measurements are not readily correlated and accounted for in the instrumentation. These factors, which contribute to imprecise fuel content measurements, are compensated for by carrying additional fuel in each of the tanks using worst-case assumptions, sufficient to more than compensate for tolerances in the fuel measurement instrumentation based on capacitance sensors.

SUMMARY OF THE INVENTION

According to one aspect of the invention, method and apparatus are provided for simultaneously measuring the density, volume and mass of liquid held in a container, such as aviation fuel carried in an aircraft tank. The method comprises the steps of measuring pressures, by suitable pressure sensors, at four or more sensor points of known coordinate locations, such locations being disposed in an array at different distances beneath the surface plane of the liquid. These four pressure measurements, P1, P2, P3, and P4, are processed by a microcomputer, which is programmed to establish a series of simultaneous relationships, relating the value of the pressure at each sensor location to various unknown parameters including the density $\rho$ of the liquid and the position (orientation and distance to sensors) of the surface plane. Simultaneous solutions to the various relationships based on the pressure measurements, P1, P2, P3, and P4, are obtained and the microcomputer produces signals representing density $\rho$, and the orientation of the surface plane and its distance from the locations of the pressure measurements. Further processing of these output signals by the microcomputer yields the volume of the contained liquid (amount of liquid that fills the tank up to the now-located surface plane) and the mass of the liquid (determined by multiplying the measured density $\rho$ times the measured liquid volume). The resulting signals representing the density $\rho$, volume V, and mass M of the liquid are displayed on readout devices and/or are stored in volatile or permanent memory devices coupled to the output ports of the microcomputer.

The apparatus comprises the array of pressure sensors mounted on a bracket that in turn is anchored inside a liquid storage tank and arranged as described above in the summarized method, transducer means for converting the sensed pressures P1, P2, P3, and P4 into representative electrical signals, signal input means for feeding such pressure signals into a programmed microcomputer that is programmed in accordance with the above-summarized method, and suitable readout devices for displaying the measured density $\rho$, volume V, and mass M.

The above-summarized method and apparatus advantageously measure the volume V and mass M by taking into account variations in density $\rho$. Other advantages include the adaptability of the method and apparatus to make measurements in tanks of varied and complex shapes and immunity to such environmental conditions that are common problems for liquid, and particularly fuel-metering systems, including corrosion, microbe growth, the presence of other contaminants, and electromagnetic interference. Another advantage of this method and aparatus, when used for measuring fuel reserve in aircraft tanks is an automatic accountability for various pitch and roll conditions of the aircraft during gauging.

Another aspect of the invention is to provide a method and apparatus similar to those summarized above, but employing a minimum of three or more pressure sensor locations and associated sensors, and processing representative pressure signals P1, P2, and P3 to yield output signals of liquid volume V and mass M, when the density $\rho$ is either known or assumed. In this case, the required number of sensors is less because the density is known, thereby eliminating one variable and hence the need for one of the simultaneously solvable relationships.

DETAILED DESCRIPTION OF THE PREFERRED EMBODIMENT

Figure 1:
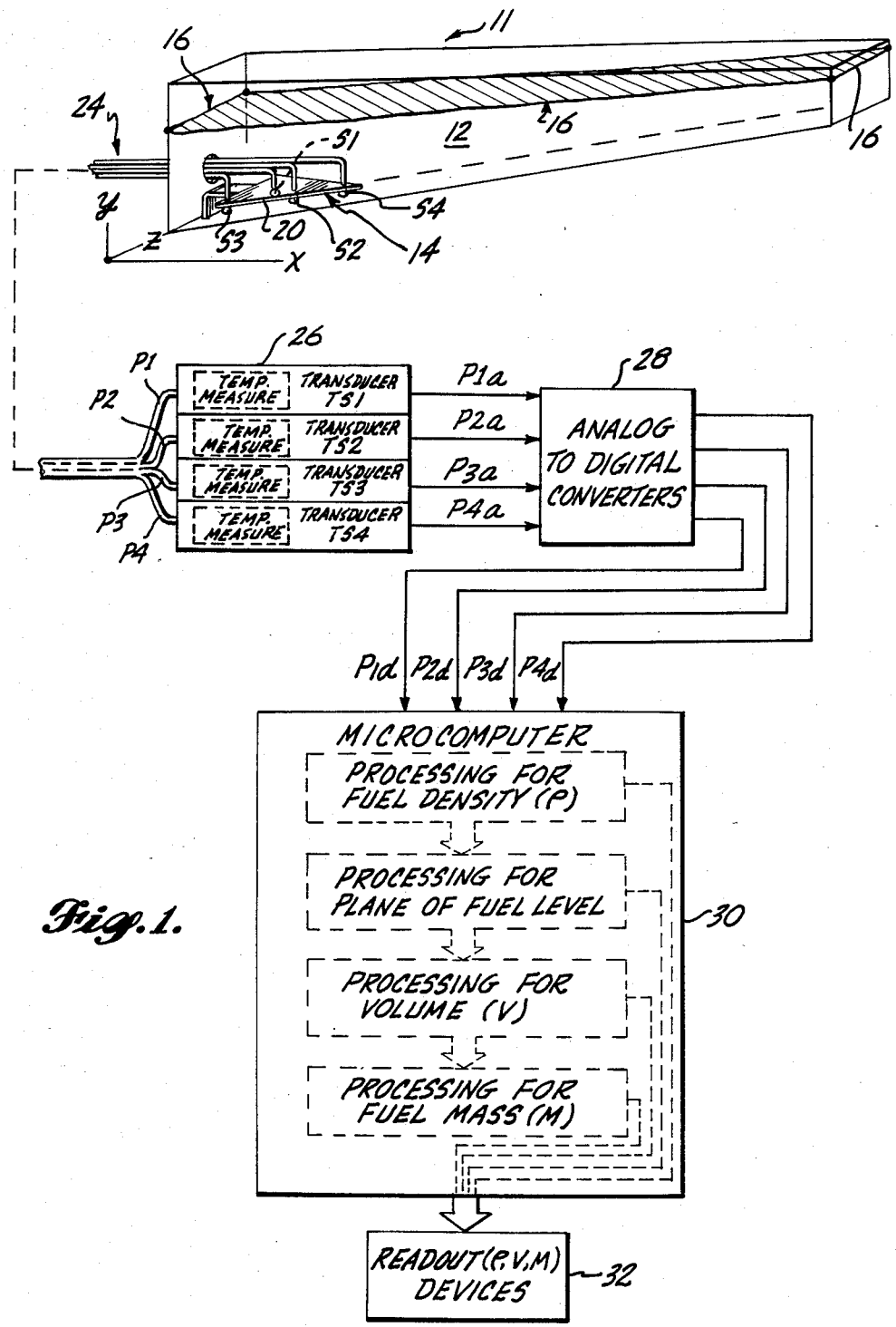
FIG. 1 is a composite schematic and block diagram of a preferred embodiment of the liquid storage gauging apparatus according to the invention used for measuring fuel in an aviation fuel tank.

With reference to FIG. 1, the preferred form of the invention is to provide for measuring density, volume and mass of fuel contained in an aviation fuel tank 11, which is typically of irregular geometry, because of being shaped to fit inside the profile of the aircraft wing, fuselage or other body section. Further complicating the gauging methodology is the fact that the density $\rho$ of the fuel 12 contained by tank 11 varies considerably depending upon its source, the ambient temperature and pressure, and other variables outside the control of the aircraft user. As mentioned above, variations in fuel density are manifested by different energy content per unit of volume of fuel and hence it is necessary to measure and account for the actual density $\rho$ in determining the effective quantity of the fuel reserve in tank 11. The density $\rho$ may vary by as much as 0.2 to 0.3 pounds per gallon, and a typical range is from approximately 6.2 pounds per gallon to 6.7 pounds per gallon. Such a difference in density can have a significant effect on the available energy content of the fuel reserve.

Figure 2:
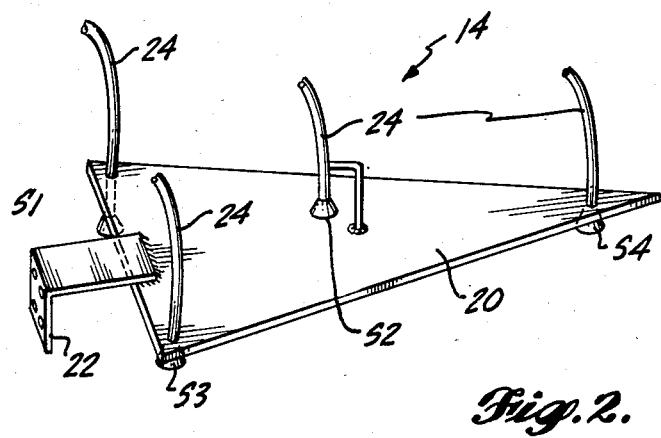
FIG. 2 is an isometric view of an array of pressure sensors mounted in fixed relationship within the fuel tank illustrated in FIG. 1.

To measure density along with volume and mass, an array 14 of pressure sensors is mounted within tank 11 near the bottom so as to be submerged below the fuel surface as long as a minimum reserve quantity of fuel remains in tank 11. Array 14 incorporates a minimum of four separate pressure sensors shown more clearly in FIG. 2 as sensors S1, S2, S3 and S4 which are mounted on a triangular shaped plate 20 which in turn is secured to an interior wall of tank 11 by a bracket 22 so that the sensors are fixed relative to the walls of tank 11 and hence relative to the tank geometry. The importance of fixing the location of array 14 relative to the tank geometry will be explained below. Sensors S1 through S4 are actually sensing tubes ported at a lower, sensing end so as to communicate thereat with fuel 12 with the resulting pressure of the fuel at that location being in turn transmitted by air pressure through lengths of flexible tubing 24, one per sensor, to a bank of pressure-to-electric signal transducers 26 individually designated TS1, TS2, TS3, and TS4, respectively. As described more fully herein, transducers 26 compare the liquid pressure of the fuel at the ported ends of sensors S1 through S4 with ambient pressure and produce corresponding electrical analog signals represented as P1$a$, P2$a$, P3$a$, and P4$a$. The pressure signals are adjusted for temperature variations by proper coeeficients calculated by the microcomputer 30 using temperature measurements available from temperature sensors mounted with transducers 26.

Sensors S1, S2, S3, and S4 are preferably of a differential, oscillating quartz type in which the fluid pressure present at the open-ended sensing ports S1 through S4 of tubing 24 is applied to a mechanical device that responds to a pressure differential to develop a proportional force that in turn is exerted against a quartz crystal force sensor. The quartz crystal force sensor, which is also in communication with ambient pressure, oscillates at a frequency that varies in a predictable manner in reaction to the applied differential force and variations in the frequency of oscillations are calibrated to a high degree of pressure-measuring accuracy. This combination of the sensor and transducer is known per se and is described in Measurements and Data, Issue No. 56, Vol. 10, No. 2, March/April 1976. A device for measuring the pressure in this manner can be calibrated to achieve a measurement tolerance of one-tenth of a percent of the actual pressure. While other pressure sensors may be used, the relatively high accuracy of this type sensor-transducer combination makes it preferred for use in the apparatus disclosed herein.

A set of analog-to-digital converters 28 convert the analog signals corresponding to the sensed pressures into digital form with the resulting digitized signals being represented as P1$d$, P2$d$, P3$d$, and P4$d$. Such signals provide the variable inputs to a programmed microcomputer 30.

Figure 4:
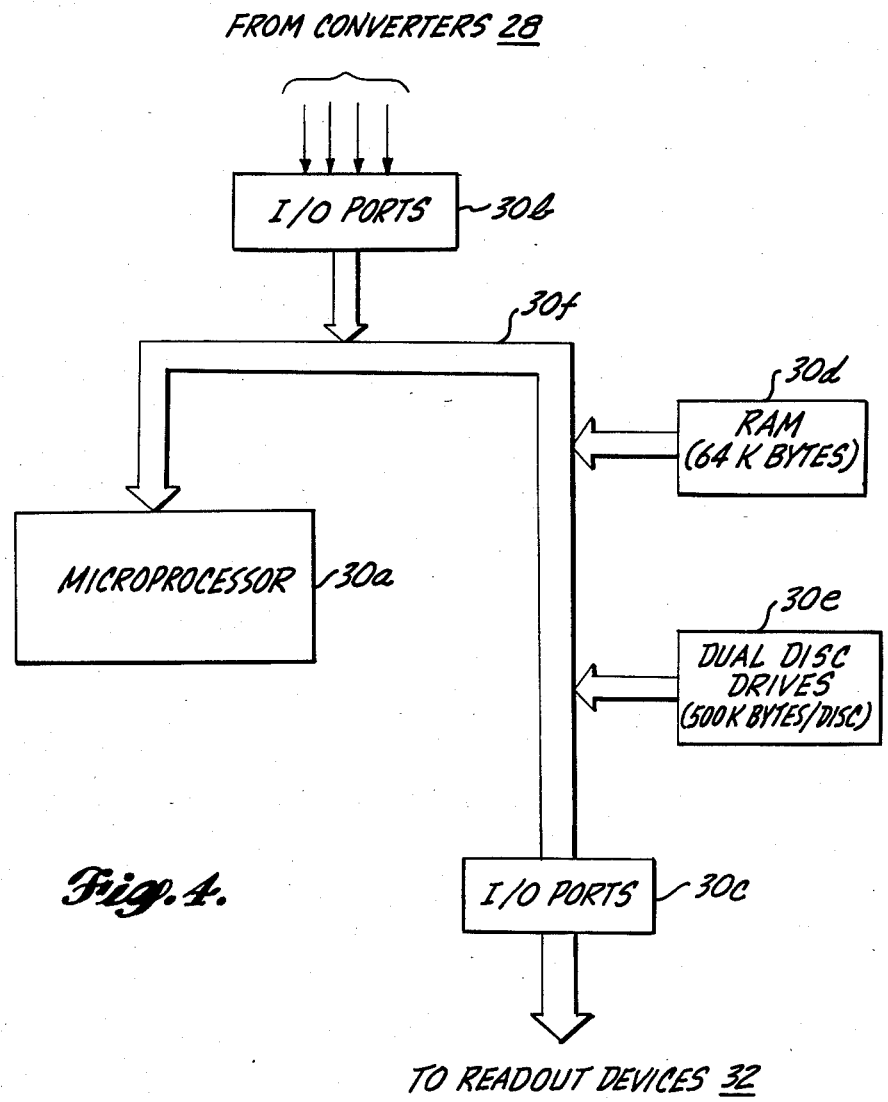
FIG. 4 is a more detailed block diagram of the components of the microcomputer shown generally in FIG. 1.

While a number of commercially available devices are suitable for use as microcomputer 30, as shown in more detail in FIG. 4 this particular embodiment incorporates a microprocessor 30$a$ manufactured and available from California Computer Systems or S.D. Computer Products as their Model 280 microprocessor, cooperating sets of input/output (I/O) ports 30$b$ and 30$c$, a 64K byte random-access memory (RAM) 30$d$, and dual disc drives 30$e$ having a capacity of 500K bytes per disc, all linked by data and control bus 30$f$.

In accordance with the principles of the invention, microcomputer 30 cooperates with the array 14 of pressure sensors to provide a sufficient number of pressure readings and hence digitized pressure signals P1d through P4d so that a series of simultaneously solvable equations is established within the microcomputer to thereby allow for simultaneous determination of density ($\rho$), volume (V) and mass (M) of the fuel. The magnitude of one or more of these parameters is then indicated on readout devices 32. The plurality of pressure measurements is processed in the set of simultaneously solvable equations to first determine density $\rho$; then further processing yields the orientation of the surface plane 16 of fuel 12 and the distance of such plane from array 14; form the now established position of plane 16, the volume V of fuel 12 that fills tank 11 up to the surface plane is computed and; finally, the mass M of fuel 12 is computed from the product of the predetermined density $\rho$ and volume V.

Devices 32 may be conventional LED displays and if desired a recording device (not shown) may be connected in parallel with devices 32 to make a record of variations in $\rho$, V, and M as a functon of flight time, to be used in post-flight analysis.

Figure 3:
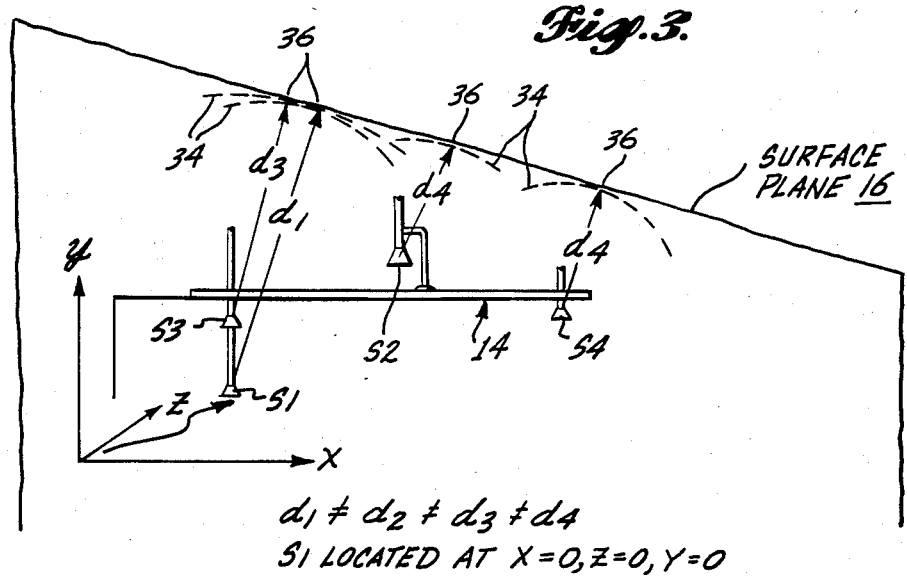
FIG. 3 is a front elevational view of the array of pressure sensors of FIG. 2 shown in relation to the surface plane of the contained fuel.

Now, with reference to FIG. 3, array 14 of sensors S1 through S4 is disposed in tank 11 so that the various sensors are at nonequal but unknown depths D1, D2, D3, and D4 beneath the surface plane 16 of fuel 12. The depths D1 through D4 are oriented along vectors that are assumed to be normal to the orientation of surface plane 16. However, the precise orientation of surface plane 16 is an unknown variable and is simultaneously determined along with the distances of depths D1–D4 at the time that the gauging system measures the variables of density, volume and mass.

More particularly, to determine the orientation of surface plane 16 relative to array 14, the following relationships are used. First, the scalar (without direction) distances or depths D1 through D4 of each of the four sensors relative to the surface plane 16 of the fuel can be represented by the relationships $$D_i = P_i/\rho,$$

where i=1, 2, 3, and 4. Since the orientation of surface plane 16 is also unknown at this phase of the measurement process, the vector directions of such distances Di are unknown; however, it is known that the scalar value of each of these distances defines an imaginery spherical surface shown by the dotted lines 34 in FIG. 3 and that collectively these four spherical surfaces must contact the common surface plane 16 at different tangential contact points indicated at 36. Secondly, the array 14 of sensors S1 through S4 is arranged so that nominally none of the distances or depths, D1, D2, and D3, and D4, are equal. By making the depths of the various sensors unequal, a set of simultaneous relationships may be established, as set forth below, and in which the solution for density $\rho$ depends on the differences between the various pressure readings at S1, S2, S3, and S4.

DETERMINING DENSITY FROM PRESSURES AT FOUR KNOWN POINTS IN FUEL TANK WHEN THE DENSITY $\rho$ IS UNKNOWN Equation of liquid plane:

$$\hat{n} \cdot \vec{r} = d$$

$\hat{n}$ = unit vector normal to plane $\vec{r}$ = point on plane d = perpendicular distance (minimum distance) of plane from coordinates system origin, where pressure sensor locations = $\vec{r_i}$, pressure readings = $P_i$, and density = $\rho$.

Then:

$$\vec{r} = \vec{r_i} + \hat{n}\frac{P_i}{\rho},$$

or:

$$\hat{n} \cdot \vec{r_i} + \frac{P_i}{\rho} = d.$$

The relative sensor locations are defined as:

$\vec{r_1}$    1. choose as origin (0, 0, 0)
$\vec{r_2}$    2. choose on x-axis ($x_2$, 0, 0)
$\vec{r_3}$    3. choose on z=0 plane ($x_3$, $y_3$, 0)
$\vec{r_4}$    4. choose outside of xy, yz, and zx planes ($x_4$, $y_4$, $z_4$)

and then system of equations is:

$$\begin{pmatrix} 0 & 0 & 0 & -1 \\ x_2 & 0 & 0 & -1 \\ x_3 & y_3 & 0 & -1 \\ x_4 & y_4 & z_4 & -1 \end{pmatrix} \begin{pmatrix} n_1 \\ n_2 \\ n_3 \\ d \end{pmatrix} = \frac{1}{\rho} \begin{pmatrix} P_1 \\ P_2 \\ P_3 \\ P_4 \end{pmatrix}$$

where $\hat{n} = (n_1, n_2, n_3)$ and d are unknown.

Define the 4×4 matrix Ma as:

$$Ma \begin{pmatrix} n_1 \\ n_2 \\ n_3 \\ d \end{pmatrix} = -\frac{1}{\rho} \begin{pmatrix} P_1 \\ P_2 \\ P_3 \\ P_4 \end{pmatrix}.$$

Note that Det(Ma) = $x_2 y_3 z_4$, and that the inverse of Ma is Ma$^{-1}$, or $$\begin{pmatrix} n_1 \\ n_2 \\ n_3 \\ d \end{pmatrix} = -\frac{1}{\rho} Ma^{-1} \begin{pmatrix} P_1 \\ P_2 \\ P_3 \\ P_4 \end{pmatrix}.$$

Explicitly the inverse of matrix Ma can be written as:

$$Ma^{-1} = \begin{pmatrix} -\frac{1}{x_2} & \frac{1}{x_2} & 0 & 0 \\ \frac{x_3 - x_2}{x_2 y_3} & -\frac{x_3}{x_2 y_3} & \frac{-1}{y_3} & 0 \\ \frac{y_3 x_4 + x_2 y_4 - x_2 y_3 - x_3 y_4}{x_2 y_3 z_4} & \frac{x_3 y_4 - x_4 y_3}{x_2 y_3 z_4} & \frac{-y_4}{y_3 z_4} & \frac{1}{z_4} \\ -1 & 0 & 0 & 0 \end{pmatrix}$$

and then:

$$n_1 = \frac{P_1 - P_2}{\rho x_2}$$

$$n_2 = \frac{1}{\rho x_2 y_3} [x_2(P_1 - P_2) + x_3(P_2 - P_1)]$$

-continued
$$n_3 = \frac{1}{\rho \, x_2 y_3 z_4} \, [y_4 x_2 (P_3 - P_1) +$$
$$x_2 y_3 (P_1 - P_4) + (P_1 - P_2)(x_3 y_4 - y_4 y_3)].$$

Note that $\hat{n}$ depends on the differences of pressures.
From the relationship:

$$n_1^2 + n_2^2 n_3^2 = 1,$$

the density $\rho$ can be determined as functions of pressure differences:

$$\delta_2 = P_2 - P_1$$
$$\delta_3 = P_3 - P_1$$
$$\delta_4 = P_4 - P_1,$$

and $$\rho = \left[ \frac{\delta_2^2}{x_2^2} + \frac{[\delta_2 x_3 - \delta_3 x_2]^2}{x_2^2 y_3^2} + \frac{[x_2 y_4 \delta_3 - x_2 y_3 \delta_4 + (x_4 y_3 - x_3 y_4)\delta_2]^2}{x_2^2 y_3^2 z_4^2} \right]^{\frac{1}{2}}.$$

The value of the density $\rho$ is thus measured as a function of differences in the pressures P1, P2, P3, and P4 and of the coordinate locations of the sensors within tank 11. The processing for density $\rho$ is performed in microcomputer 30 (FIG. 1) in accordance with the flow charts of FIG. 7, described more fully below. Upon completing the signal processing for density $\rho$, microcomputer 30, as shown in FIG. 1, produces an output signal that causes the computed density to be displayed on readout devices 32 and, if desired, suitable recording device may be used as mentioned above to provide a permanent or semipermanent record of variations in density $\rho$. Additionally, the computed density value is made available within microcomputer 30 for determining the mass of fuel 12 after the pressure measurement signals are processed to locate the position of the surface plane 16 of fuel 12 as discussed below.

The apparatus and process described above for determining the density $\rho$ can be compared with a hydrometer. One of the characteristics of a hydrometer is that it will automatically assume an orientation along the gravitational force and hence normal to the surface plane of the measured liquid. In contrast, the apparatus and method described above yield a measurement of density $\rho$ without producing the hydrometer-like indication of the gravity direction and the corresponding orientation of the surface plane 16. In the above apparatus and method, the orientation of plane 16 must be separately determined in order to find the volume V of the contained fuel 12, and then from the product of the volume V and density $\rho$, a measure of the mass M of the fuel.

To determine the orientation of surface plane 16 as a prerequisite to measuring the volume V, microcomputer 30 of FIG. 1 includes a routine for locating the position of plane 16 (orientation and distance from array 14) as a function of the measured pressures P1, P2, P3, and P4 and the coordinate locations x,y, and z of each of the respective sensors S1, S2, S3, and S4. In particular, each of the components of vector $\hat{n}$ are determined from the above matrix Ma as a function of the now computed density $\rho$ and four pressure values P1, P2, P3, and P4. The vector $\hat{n}$ equals $n_1\hat{x} + n_2\hat{y} + n_3\hat{z}$, where $\hat{x}$, $\hat{y}$ and $\hat{z}$ are unit vectors, thereby defining the orientation of the surface plane 16 relative to the reference coordinate system x, y, and z within which tank 11 and the sensors of array 14 are located and the walls of tank 11 are defined. Similarly, the distance d of the surface plane 16 from the array 14 is represented by the fourth relationship of the above matrix Ma. The quantities $\hat{n}$ and d thereby define the position of plane 16 within the established coordinate system x, y, and z.

To determine volume V of fuel 12 from the now established position of surface plane 16, it is necessary to relate plane 16 to the geometry of tank 11. In other words, it is necessary to determine how much volume of tank 11 is filled by fuel 12 up to the now known position of plane 16. Two methods (and the corresponding apparatus) are disclosed herein for making this volume determination. A first approach is based on the formulation of a mathematical relationship between the position of surface plane 16 and the position of the bottom and sidewalls of tank 11 relative to the established coordinate system x, y, and z. This initial scheme represents a suitable approach when the tank containing the fuel or other liquid has a regular geometry that is easily defined by simple mathematical statements. For example, a regular polygonal shaped (rectangular walls at right angles) tank is adapted to use of this first approach. The second technique for relating surface plane 16 to the partially filled volume of tank 11 has more general application and is preferred for a tank 11 having irregular geometries such as typically found in the case of aviation fuel tanks, including wing and fuselage tanks. This second approach is based on an empirically derived correlation between various positions of surface plane 16 and the corresponding partial volume of tank 11 bounded on the top by such surface plane. Predetermined empirical relationships between the surface plane and the tank volume are stored in a memory, such as the dual disc drives 30e of microcomputer 30 (FIG. 4) and once the position of surface plane 16 is computed by microcomputer 30, the correlative volume V is retrieved from memory.

Figure 6:
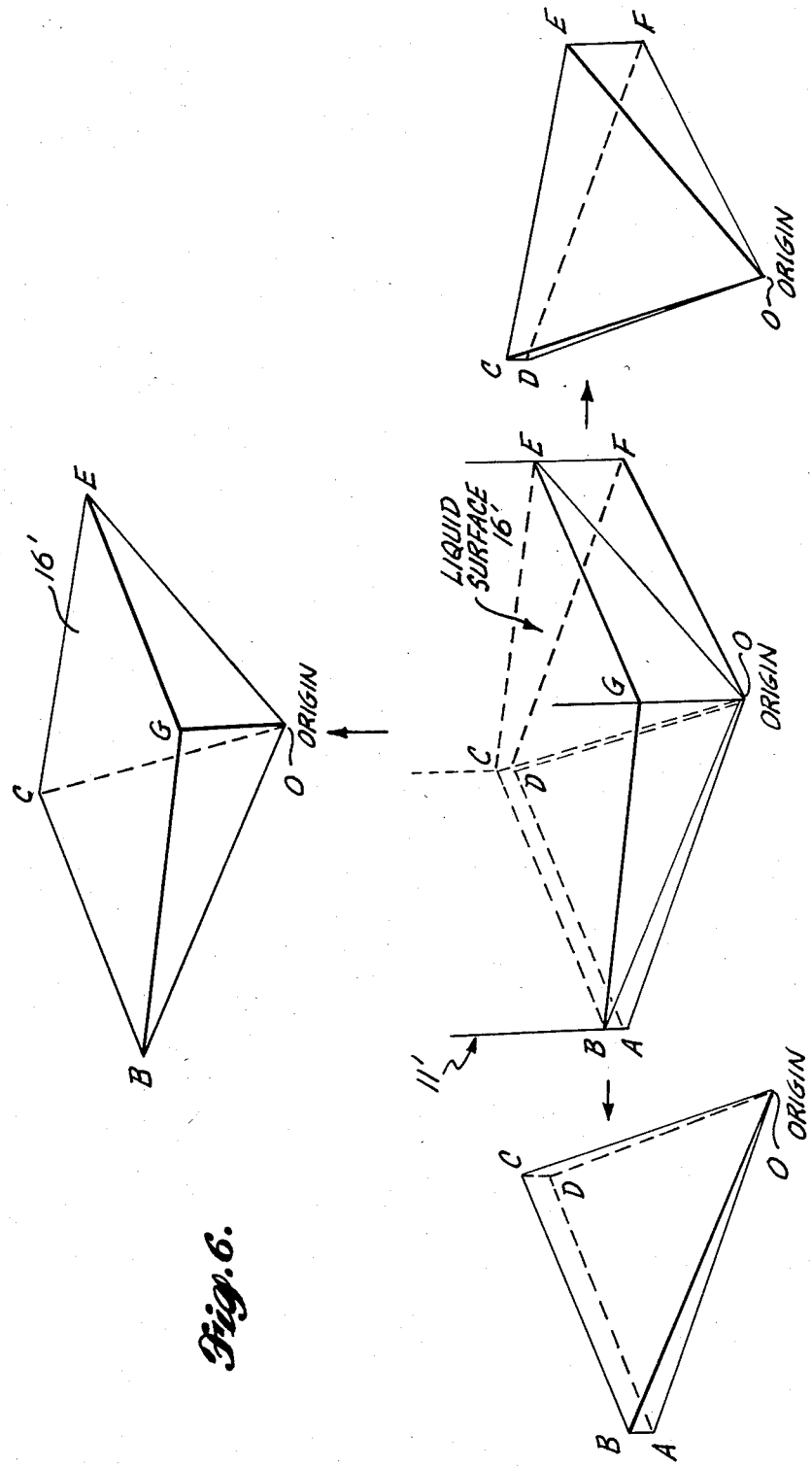
FIG. 6 is a diagram of how the volume of liquid in the tank of FIG. 5 is computed from measurements of the surface plane.

Considering now in greater detail the first of these two approaches, a regular polygon-shaped tank having rectangular top, bottom, and sides all at right angles, exhibits a geometry from which a partial volume can be computed mathematically from the points at which the surface plane 16 intercepts the vertical corners of the tank. It will be observed that surface plane 16 will define four intercepts (points along the vertical edges of the polygonal tank) and that all four such intercepts lie in the common surface plane. from these intercepts, the volume is computed by a program stored in microcomputer 30 which assumes that the unknown tank volume is formed by a plurality of interfitting, pyramidal sections as shown in FIG. 6 of the drawings and for which the volume of each pyramidal section is represented by the formula:

$$V_i = \tfrac{1}{3} A_i h_i$$

where $i = 1,2,3-n$ number of pyramidal sections, $A_i$ is equal to the area of the pyramid base of each corresponding section, and $h_i$ is equal to the height of the corresponding pyramidal section. The sum of all of the section volumes:

$$V = V_1 + V_2 + V_3 - V_n$$

is equal to the volume contained within the tank below the surface plane. The areas $A_i$ are predetermined from the bottom wall area of the regular polygonal tank and stored as fixed data in the microcomputer and the heights $h_i$ are the distances along the vertical edges of the tank corners measured between the bottom of the tank and the intercept points with the precomputed position of the surface plane. This volume computation procedure is described more fully below in connection with the alternative embodiment shown in FIGS. 5 and 6.

It will be appreciated that the foregoing computational method based on pyramidal sections is not preferred for an irregular tank geometry such as wing tank 11 shown in FIG. 1. For such an irregular tank shape, the following empirical approach to determining the partial volume of fuel 12 is preferred. Thus, with reference to FIG. 1, tank 11 is initially calibrated by incrementally adding volumes of fuel 12 of known density (and hence mass) and taking and storing pressure measurements at S1, S2, S3, and S4 as each fuel volume increment is added. Also, measurements are made of the locations where the surface plane 16 intercepts the tank edges as indicators of the position of plane 16 relative to the x, y, and z coordinates. The resulting pressure measurements and tank intercepts are fed to microcomputer 30 along with data characterizing the cumulative amount of fuel. Since the density is known, data developed by the calibration processing of tank 11 measures correlative values for the accumulated volume V of fuel 12 and the pressures P1, P2, P3, and P4. This data is stored in a memory device, such as the dual disc drives 30e of microcomputer 30 as shown in FIG. 4 and represents the position of the surface plane 16 of fuel 12 as three or more coordinates in the x, y, and z reference system and the correlative values of both the accumulated volume of fuel 12 and the pressures P1, P2, P3, and P4.

Figure 9:
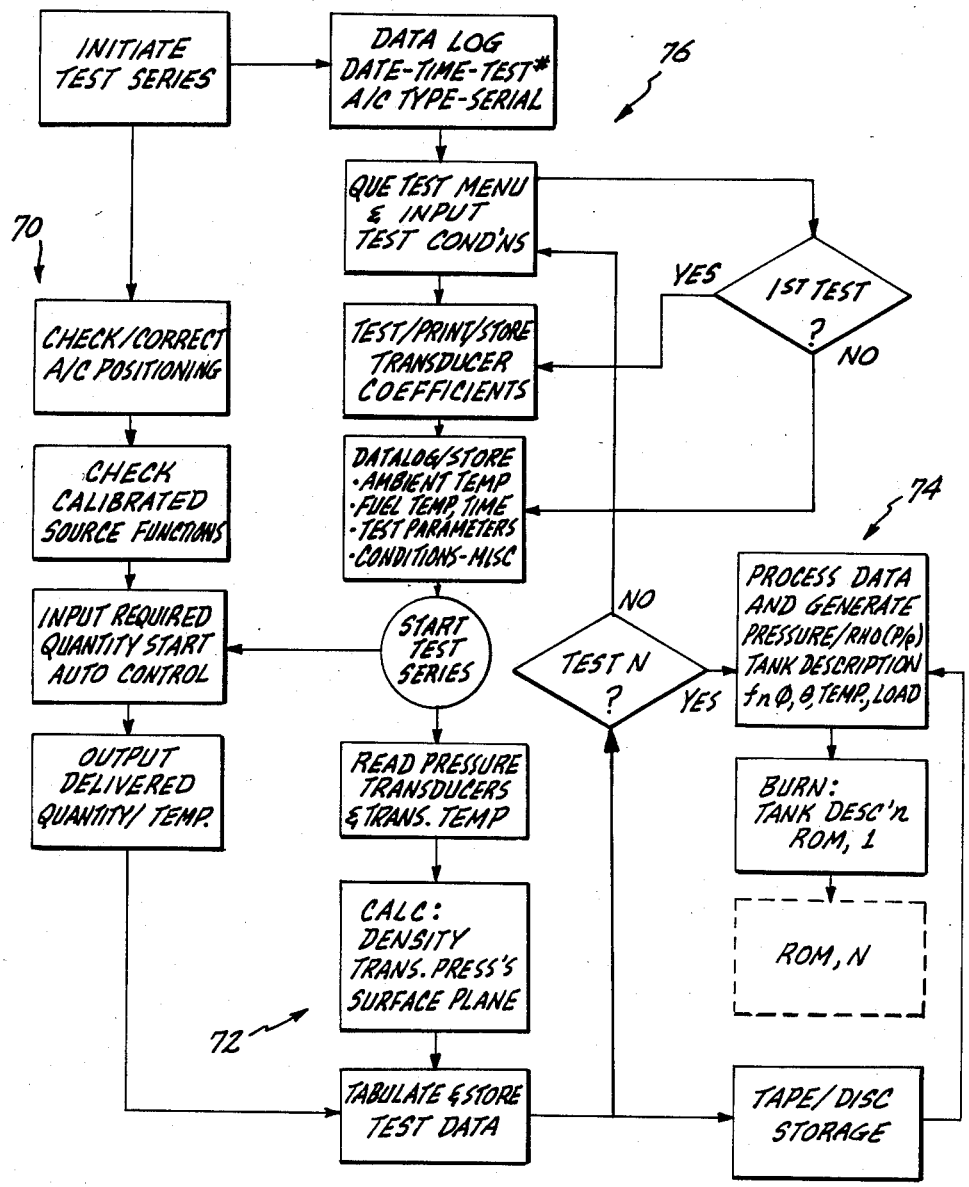
FIG. 9 is a flow diagram used in the microcomputer of FIG. 1 for calibrating a tank of irregular geometry prior to measuring unknown density $\rho$, volume V and mass M.

A rough calibration of tank 11 may be performed with the assumption that the fuel 12 will be measured only when the aircraft is in level flight or on the ground with tank 11 assuming a nominal or level orientation. In such case, the calibration process need only take into account this level orientation of tank 11 and ignore variations in the pitch and roll of the aircraft. In a more accurate and preferred embodiment, the calibration of tank 11 is performed not only for a nominal attitude of the aircraft (zero pitch), but also for variations in pitch from approximately −3 degrees through +8 degrees. This is accomplished by mechanically tilting the tank at various increments between these limits and then recording the volume and pressure measurements as described above. A suitable computer processing routine for this procedure is shown in FIG. 9 as discussed hereinafter. The above range of attitude variations accounts for most of flight and ground attitudes at which measurements of the fuel reserve are made. Variations in roll of the aircraft may be calibrated in a similar fashion. However, it is noted that gauging of the fuel tanks normally is not needed during the limited times that the aircraft is in a roll.

In the presently preferred embodiment, it is assumed that the direction of gravity during gauging of fuel tank 11 is earthward and does not change when the attitude of the aircraft varies through the angles of pitch mentioned above. However, if desired, the embodiments of the invention disclosed herein can be augmented by method and apparatus for independently measuring the direction and magnitude of the instantaneous gravitational force on the aircraft and the corresponding vector quantity can be processed in microcomputer 30 along with the above-mentioned calibration data to compensate for directions and magnitudes of gravity other than the normal earth gravity.

Once tank 11 has been calibrated in the foregoing manner, the volume V for any quantity of reserve fuel 12 will be available in microcomputer 30 by retrieving the volume as a function of the measured pressures P1, P2, P3, and P4 and the previously measured density $\rho$. A signal representing the computed volume V in now made available for display by readout devices 32 (FIG. 1).

The remaining quantity to be gauged, mass M, is determined by microcomputer 30 from the product M (mass)=$\rho \times V$. The resulting signal representing mass M is then applied to readout devices 32 for display.

It is observed that the accuracy of the method and apparatus is dependent on the degree of depth separation established for pressure sensors S1 through S4 of array 14. The greater the relative separation of these sensors (along a direction generally normal to the anticipated orientation of the surface plane 16), the greater accuracy of the measurements. However, there is a constraint on the amounts of separation at which the sensors are deployed inasmuch as all of the of sensors must be submerged at all times. This condition requires a minimum reserve of fuel below which the gauging method does not work. Thus, array 14 is generally confined to the lowermost regions of tank 11 and it is only within this limited volume that the depth separations of sensors S1 through S4 can be realized.

Figure 5:
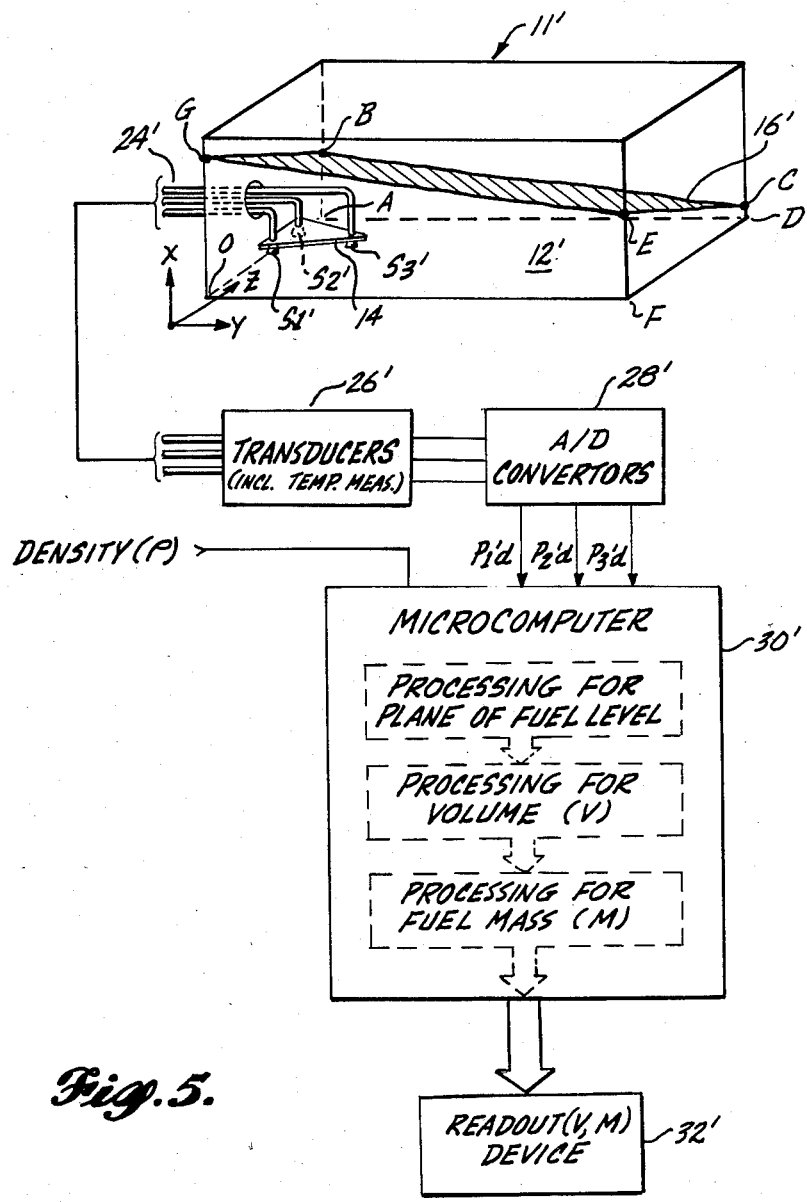
FIG. 5 is a view similar to FIG. 1 showing an alternative embodiment of the liquid storage gauging apparatus of the invention.

With reference to FIG. 5, an alternative embodiment is illustrated in which a lesser number of pressure sensors S1', S2' and S3' are deployed in an array 14' to measure the volume and mass of the remaining fuel 12' under conditions in which the density $\rho$ is known or assumed. In such case, a series of three simultaneously solvable relationships is established between the pressures measured at the three sensors of array 14', at different relative depths with respect to surface plane 16', and then solved to yield the orientation and distance of plane 16' with respect to a coordinate system of x, y, and z, in a fashion similar to the foregoing description of the embodiment of FIG. 1. The location coordinates for the sensors S1', S2', and S3' of array 14' are predetermined. The pressures sensed by array 14' are communicated over tubing 24' to a bank of pressure-to-electrical transducers 26' which produce analog pressure signals that are in turn converted by analog-to-digital converters 28' into digital pressure signals P'1d, P'2d, and P'3d as shown. Microcomputer 30' receives the digitized pressure values and also receives a digital input representing the known or assumed density $\rho$ of fuel 12' and performs the following processing The liquid or fuel surface plane 16' is again related, using vector notation, to the coordinate locations and pressure readings of sensors S1', S2', and S3' and with the density $\rho$ being known, three equations are established, as set forth below, which when simultaneously solved yield the position of plane 16'. The corresponding volume of fuel 12' is then computed by mathematically modeling the corresponding volume as illustrated in FIG. 6 in which the intercepts B, C, E, and G of surface plane 16' with the corner edges of tank 11' define different heights of a series of interfitting pyramidal segments. Collectively these pyramid-shaped segments constitute the volume of fuel 12'. Individually the pyramid segments have volumes that are readily determined using the relationship between the volume of a pyramid, the area A of the base of the pyramid, and its height as shown by the following mathematical formulations.

DETERMINING VOLUME AND MASS OF FUEL FROM PRESSURES MEASURED AT THREE TANK LOCATIONS UNDER CIRCUMSTANCES IN WHICH DENSITY IS KNOWN OR ASSUMED

Note that the geometry of tank 11' consists of seven planes: six forming the permanent tank geometry and one representing the surface 16' of the liquid, or in this case fuel, 12'.

The volume calculation is based on the following observation:

$$V = \int d^3\gamma = \tfrac{1}{3}\int \nabla \cdot \vec{\gamma} d^3\gamma = \tfrac{1}{3}\int \vec{\gamma} \cdot d\vec{A}$$

(the latter step from the integral divergence theorem). Thus, $$V = \tfrac{1}{3}\Sigma d_i A_i$$

where $A_i$ = base of pyramid from some reference point, and
$d_i$ = distance of base from reference point.

Each base of a pyramid is really one of the above seven planes. Therefore, if the reference point is permanently chosen at the intersection of three of the permanent tank planes (sides), three of the pyamids are eliminated because the corresponding $d_i = 0$. This leaves at most four pyramidal volumes to be computed.

SPECIFICATION OF PLANES

The equations for the characterizing planes are written in normal form as:

$$\hat{n} \cdot \vec{\gamma} = d$$

where $\hat{n}$ = unit vector normal to plane pointing out from liquid volume volume (^ over a vector implies a unit vector),
$\vec{\gamma}$ = point on plane, and
d = distance of plane from origin of coordinate system.

SPECIFICATION OF LINES

A line is given by the equation:

$$\vec{r} = r_o + \hat{c}s$$

where $\vec{r}$ = variable point on line,
$\vec{r}$ = fixed point on line,
$\hat{c}$ = unit vector along line, i.e., direction cosines of line, and
s = distance along line from fixed point.

DETERMINATION OF LIQUID SURFACE PLANE

The liquid surface plane is thus:

$$\hat{n}_4 \cdot \vec{r} = d_4$$

The measurements of pressure are made $P_i$, i = 1, 2, 3. These define spherical distances $P_i/\rho$ ($\rho$ = density), which must be on liquid plane, i.e., $$\vec{r}_i = \vec{r}_{ci} + \hat{n}_4 P_i/\rho$$

where $\vec{r}_c$ represents the points where pressure sensors are mounted. Then $$d_4 = \hat{n}_4 \cdot \vec{r}_{ci} + P_i/\rho, \; i = 1, 2, 3$$

These three equations together with the equation:

$$n_4^2 = 1$$

are sufficient to determine $\hat{n}_4$ and $d_4$.

PYRAMID BASE AREAS

The pyramid bases are in general N-gons where N ranges from 3 to 6. That is, the pyramid bases can be triangles, quadrilaterals, pentagons, or hexagons. These base figures are determined by their vertices, which form a set of points defined by the intersections of the relevant planes. Part of this set of points consists of the points of intersections on the permanent tank structure. The remainder of such set of points is derived from the intersections of the liquid surface plane with the tank structure. These points can be enumerated as follows:

1. Seven permanent points (there are really eight but one is chosen as the origin and is omitted from consideration).
2. Twelve variable points formed by intersections of the permanent tank edges with the liquid plane surface. In general it is necessary to determine:
   1. Whether these points indeed belong to or are on the volume of interest (many may not).
   2. Those points that determine a specific pyramid base.

CALCULATION OF BASE AREAS

Once a set of points has been determined to define a base area of a pyramid, it is necessary to calculate this base area. To do this, it is important to make sure the points are ordered correctly. The reason for this is that the area is computed by summing the area of the triangles that comprise the base. Let the set of points $P_i$ determine a base. Then define a centroid as:

$$\vec{P}_s = \frac{\sum_{i=i}^{\hat{n}} p_i}{n}$$

Next determine a set of vectors relative to this centroid; these will all lie in the base plane.

$$\vec{q}_i = \vec{p}_i - \vec{p}_s$$

For convenience, we also define $q_i$. The unit vectors $q_i$ are on a unit circle in the base plane with $P_s$ as the center:

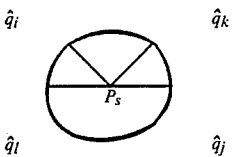

These are then ordered so that they are sequenced in order around the circle. If the sequence is defined by $I_i$, $I_z$, $-I_n$, the total area of the base is just $$A = \tfrac{1}{2}[|\hat{q}_{I_1} \times \vec{q}_{I_2}| + |\vec{q}_{I_2} \times \vec{q}_{I_3}| + \ldots |\vec{q}_{I_n} \times \vec{q}_{I_1}|]$$

VOLUME AND MASS

Once the appropriate areas have been found, the volume is given by $$V = \tfrac{1}{3}\Sigma d_i A_i,$$

and the mass is then the product of the known density $\rho$ and the measured volume or:

$$M = \rho V.$$

A suitable processing program for effecting the above-described operations in microcomputer 30' is shown in the flow diagram of FIG. 8, and is described below. As is the case with the preferred embodiment, the foregoing computational method is not applicable to irregularly shaped tanks. It will be appeciated that the empirical approach described earlier for determining incremental volume/pressure relationships for tanks of this type can be used as well with the alternative embodiment shown in FIGS. 5 and 6.

FLOW DIAGRAMS

Figure 7:
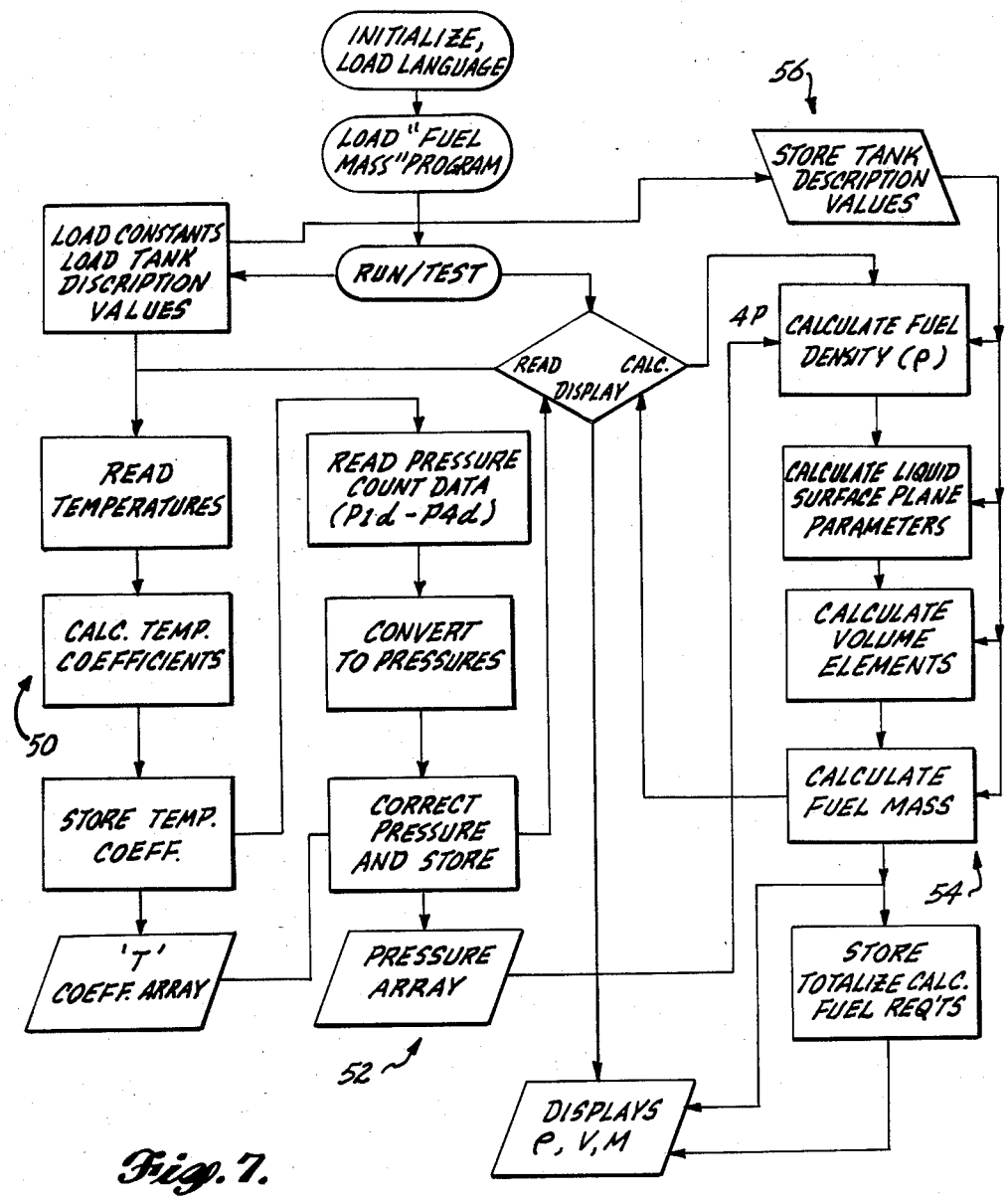
FIG. 7 is a flow diagrams of a program incorporated in the microcomputer of FIG. 1 for processing the multiple pressure signals to yield the parameters of density $\rho$, volume V, and mass M.

With reference to FIG. 7 a flow diagram illustrates the sequence of data storage and signal processing steps performed by the programmed microcomputer 30 in accordance with the above-described embodiment of FIGS. 1 through 4. While it is believed that the above description of this embodiment, including the stated mathematical relationships, is adequate to enable a person of ordinary skill in this art to prepare a program for operating microcomputer 30 to produce the resulting signal quantities for density $\rho$, volume V, and mass M, the flow diagrams of FIG. 7 is set forth here to assist in such programming. The program depicted has three principal sections including a temperature compensating loop 50, a pressure measurement read and store loop 52 and a calculation loop 54 which cofunction to carry out the processing of the four pressure measurements to yield first density $\rho$, the volume V in conjunction with stored tank geometry valves 56, and then mass M.

Figure 8:
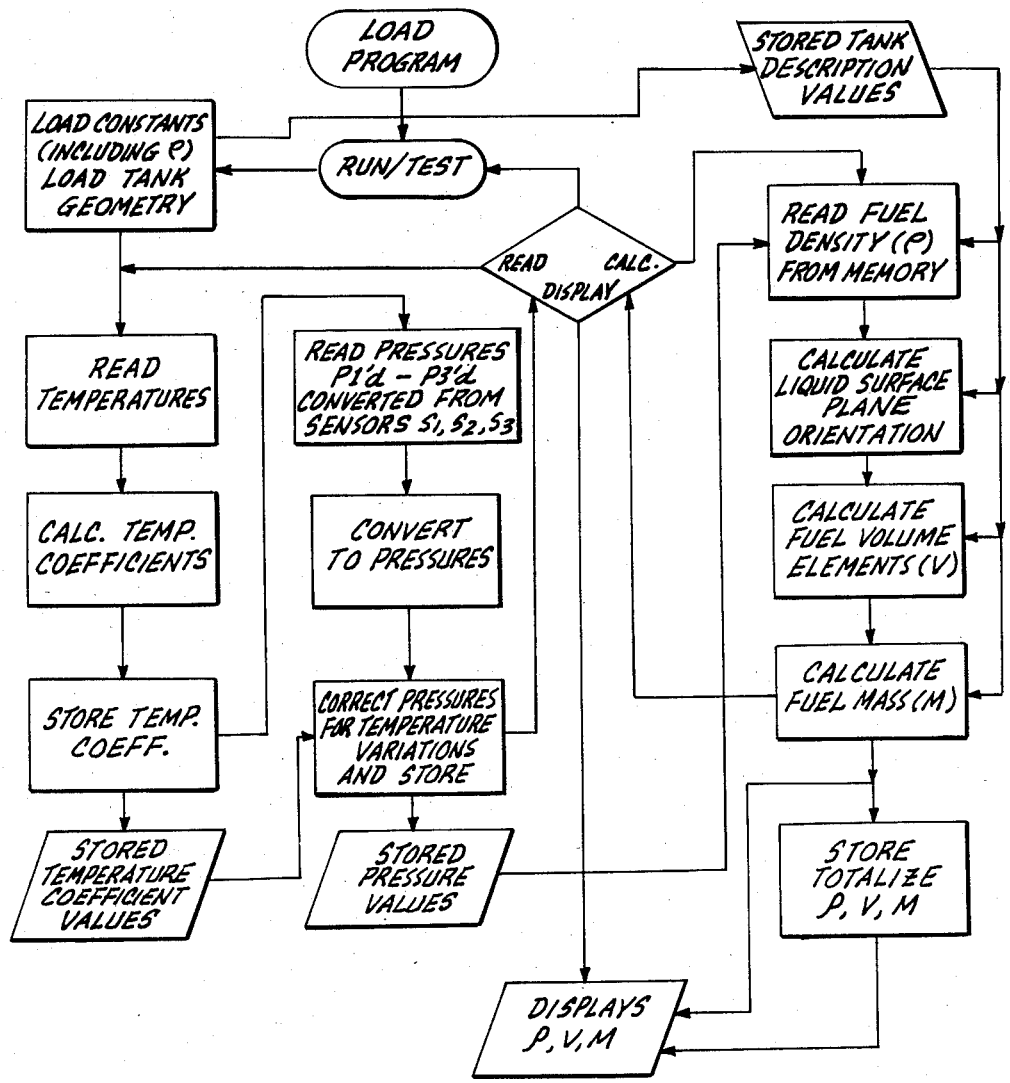
FIG. 8 is a flow diagram of a program used in the microcomputer in the embodiment of FIG. 5 for processing three pressure measurements to yield the parameters of volume V and mass M when the density $\rho$ is known or assumed.

Similarly, the flow diagram of FIG. 8 is presented to assist in the programming of microcomputer 30' as used in the embodiment shown in FIGS. 5 and 6. The FIG. 8 flow diagram is basically the same as in FIG. 7 except that only three pressures are inputted and processed, and the density $\rho$ is read from input data rather than being calculated.

FIG. 9 shows a suitable processing routine for use in the preferred embodiment of FIGS. 1-4, for initially calibrating a tank of irregular geometry prior to use for measuring unknown density $\rho$, volume V and mass M. The routine consists of a sequence of tests, each test involving an incrementing fuel loop 70, pressure/temperature measurement and surface plane computation loop 72, and a tank data storing loop 74. Common to each test, is a conditions determining and store loop 76 that registers conditions of ambient temperature, fuel temperature, test parameter including tank pitch $\phi$ and roll (if desired) and other conditions that may influence calibration. As each increment of fuel is added pursuant to loop 70, the resulting pressure/density ratio for each pressure transducer is computed and stored along with the fuel volume in a non-volatile memory such as ROM, from which the volume data can be retrieved later during measurements of unknown fuel volume.

While only particular embodiments have been disclosed herein, it will be readily apparent to persons skilled in the art that numerous changes and modifiations can be made thereto including the use of equivalent means, devices, and method steps without departing from the spirit of the invention.

The embodiments of the invention in which an exclusive property or privilege is claimed are defined as follows:

1. A method of measuring density $\rho$ of a liquid from a plurality of pressure measurements, comprising the steps of:
    sensing the liquid pressure $P_i$ at a plurality of at least four separate sensing locations, said sensing locations defined relative to a selected coordinate system by vectors $\vec{r}_i$, where $i=1, 2, 3,$ and 4, and disposed at different depths relative to the surface plane of the contained liquid that is being measured;
    converting the sensed pressures $P_i$, corresponding to the sensing locations into representative first, second, third, and fourth electrical signals;
    inputting the first, second, third, and fourth electrical signals along with signals representative of vectors $\vec{r}_i$ into a computing device;
    setting up in a computing device a formula relating an unknown density $\rho$ of the liquid as a function of the first, second, third, and fourth electrical signals representing pressures $P_i$ that is based on a series of simultaneously solvable equations relating such liquid pressures to the unknown density $\rho$ of the liquid, the unknown depth of such sensor locations defined by vectors $\vec{r}_i$ and said surface plane of the liquid which is common to all of the sensor locations, and computing in the computing device an electrical signal representing density $\rho$ as a function of the first, second, third, and fourth electrical signals representing pressures $P_i$; and
    outputting from said computing device the density $\rho$.

2. The method of claim 1 wherein said step of computing includes the substep of:
    computing the orientation and distance of said surface plane of the liquid with respect to said sensing locations whereat said pressures $P_i$ are sensed.

3. The method of claim 1 for measuring a volume of the liquid when confined in a container of predetermined configuration, wherein said step of computing further comprises the substeps of computing the orientation and distance of said surface plane of the liquid within said container as a function of the electrical signals representing the pressures $P_i$ and the measured density $\rho$ of the liquid, wherein said orientation and distance of said surface plane are computed relative to said pressure sensing locations;

computing the volume V of the liquid as a function of a predetermined relationship between said orientation and distance of the surface plane relative to said pressure sensing locations and said fixed configuration of said container; and said outputting step comprising the substep of outputting the computed volume of the liquid.

4. The method of claim 3 for measuring, in addition to density $\rho$ and volume V of the liquid, a mass M, further including the step of:

computing the mass M of the liquid confined in said container as a function of the measure density $\rho$ and volume V; and, said outputting step further including outputting the computed mass M.

5. An apparatus for measuring density $\rho$ of a liqud from a plurality of pressure measurements, comprising:

first, second, third and fourth pressure sensor means adapted to be disposed at known, spaced-apart locations beneath a surface plane of the liquid, wherein said locations are defined by position vectors $\vec{r}_i$ (i=1,2,3,4) and are disposed at different, unknown distances from said surface plane, said position vectors $\vec{r}_i$ (i=1,2,3,4) being related to a coordinate system and defined by associated coordinates $x_i, y_i, z_i$ (i=1,2,3,4);

electrical means associated with said pressure sensor means for producing first, second, third and fourth electrical signals representing pressures $P_1$, $P_2$, $P_3$, and $P_4$ existing within the liquid respectively at said associated locations defined by position vectors $\vec{r}_i$ (i=1,2,3,4), said density $\rho$ being a function of said first, second, third and fourth electrical signals representing pressures $P_1$, $P_2$, $P_3$, and $P_4$ and said coordinates $x_i, y_i, z_i$ (i=1,2,3,4);

computing means for computing density $\rho$ as a function of said first, second, third and fourth electrical signals and said coordinates $x_i, y_i, z_i$ (i=1,2,3,4); and output means connected to said computing means for indicating the density $\rho$.

6. The apparatus of claim 5 wherein said pressure sensor means further includes means for detecting said liquid pressure while communicating with ambient pressure.

7. The apparatus of claim 5 wherein said computing means further includes means for computing the orientation and distance of said surface plane of the liquid with respect ot said predetermined locations of said first, second, third, and fourth pressure sensor means.

8. The apparatus as set forth in claim 1 wherein said computing means further comprises means for producing electrical signals representing the orientation of said surface plane relative to said point of origin with respect to which said predetermined locations of said first, second, third and fourth pressure sensor means are defined.

9. The apparatus set forth in claim 5 in which said first, second, third and fourth pressure sensor means are disposed in a liquid container of predetermined configuration, and wherein said computing means comprises first submeans for computing an orientation and distance of the surface plane of a liquid within said container as a function of the determined density $\rho$ of the liquid; and second submeans for producing electrical signals that represent a liquid volume as a function of a predetermined relationship between an orientation and distance of the surface plane of the liquid relative to the point of origin of said coordinate system and said predetermined configuration of said container.

10. An apparatus for determining the position of a surface plane of a liquid from a plurality of subsurface pressure measurements comprising:

first, second and third pressure sensor means adapted to be disposed beneath the surface plane of a liquid having a given density $\rho$ and at predetermined locations of nonequal depths below such surface plane, said predetermined locations being defined by a coordinate system referenced to a predetermined point of origin;

electrical signal-producing means associated with said first, second and third pressure sensor means for producing electrical signals representing liquid pressures $P_1$, $P_2$, and $P_3$ respectively at said first, second and third pressure sensor means;

signal-processing means for receiving said signals representing pressures $P_1$, $P_2$, and $P_3$ and for producing electrical signals representing the orientation and distance of the surface plane referenced by said coordinate system to said point of origin.

11. The apparatus of claim 10 further comprising a container of known configuration and in which said first, second and third pressure sensor means and said liquid are disposed, and wherein signal-processing means comprises submeans for producing electrical signals representing the volume of said liquid that is present in said container as a function of the relationship between said orientation and distance of the surface plane relative to said point of origin and said known configuration of said container.

12. A method of measuring density $\rho$ of a liquid from a plurality of pressure measurements, comprising the steps of:

sensing the liquid pressure at a plurality of at least four separate sensing locations, said locations defined relative to a selected coordinate system by associated position vectors $\vec{r}_i$ (i=1,2,3,4), wherein said sensing locations are disposed at different depths relative to the surface plane of the liquid that is being measured and the distance from the origin of said coordinate system to said surface plane along a line perpendicular to that plane is symbolized as d, and wherein $\hat{n}$ symbolizes a unit vector relative to the coordinate system that is normal to said surface plane;

converting the sensed pressures corresponding to the sensing locations into representative first, second, third and fourth electrical signals symbolized by $P_i$ (i=1,2,3,4);

inputting the first, second, third and fourth electrical signals along with electrical signals representative of said vectors $\vec{r}_i$ and $\hat{n}$ and electrical signals representative of distance d into a computer;

setting up within said computer formulas equating distance d with the sum of the product of vector $\hat{n}$ and vectors $\vec{r}_i$ and the quotient of pressure $P_i$ over density $\rho$ for i=1,2,3,4;

simultaneously solving said formulas within said computer to determine the value of density $\rho$; and outputting from said computer said value of density $\rho$ for display or recordation.

13. The method of claim 12 wherein said step of simultaneously solving said formulas includes solving said formulas to determine the values of the vector $\hat{n}$ and the values of distances d for defining the surface plane of the liquid with respect to said coordinate system

14. The method of claim 13 for measuring, in addition to the density $\rho$, volume V of the liquid, wherein the liquid is confined in a container of predetermined configuration, said inputting step including the substep of storing in the computer a multitude of values for vector $\hat{n}$ and d that define a multitude of possible positions of said surface plane and an associated multitude of possible volumes defined by said surface plane with respect to said container; wherein after said simultaneously solving step the method further includes the steps of comparing said solved value of vector $\hat{n}$ and d with each stored value of vector $\hat{n}$ and d to determine which stored value of vector $\hat{n}$ and d most closely correspond to the solved value of vector $\hat{n}$ and d; and said outputting step further including outputting the value of the stored volume corresponding to the stored value of vector $\hat{n}$ and d determined to most closely correspond to the solved value of vector $\hat{n}$ and d.

* * * * *

UNITED STATES PATENT AND TRADEMARK OFFICE
CERTIFICATE OF CORRECTION

PATENT NO. : 4,553,216
DATED : November 12, 1985
INVENTOR(S) : Glenn G. Stevens et al.

It is certified that error appears in the above-identified patent and that said Letters Patent is hereby corrected as shown below:

| | | |
|---|---|---|
| Column 1, | line 21: | delete "," (comma) after "monitored" |
| Column 3, | line 33: | "diagrams" should be --diagram-- |
| Column 3, | line 36: | delete "and" (2nd occurrence) after "M;" |
| Column 4, | line 26: | "coeeficients" should be --coefficients-- |
| Column 4, | line 49: | insert --of-- after "type" |
| Column 4, | line 59: | insert --,-- (comma) after "4" |
| Column 4, | line 62: | "280" should be --Z80-- |
| Column 5, | line 13: | "form" should be --from-- |
| Column 5, | line 21: | "functon" should be --function-- |
| Column 5, | line 39: | "relationships" should be --relationship-- |
| Column 5, | line 63: | "pIS" should be --p IS-- |
| Column 7, | line 40: | insert --a-- before "suitable" |
| Column 8, | line 56: | "from" should be --From-- |
| Column 9, | line 37: | insert --,-- (comma) after "4" |
| Column 10, | line 16: | "in" should be --is-- |

UNITED STATES PATENT AND TRADEMARK OFFICE
CERTIFICATE OF CORRECTION

PATENT NO. : 4,553,216  
DATED : November 12, 1985  
INVENTOR(S) : Glenn G. Stevens et al.

It is certified that error appears in the above-identified patent and that said Letters Patent is hereby corrected as shown below:

Column 10, line 31: delete "of" (2nd occurrence)

Column 11, line 51: delete "volume" (2nd occurrence)

Column 11, line 65: "$\vec{r}$" should be --$\vec{r}_o$--

Column 12, line 15: "$\vec{r}_c$" should be --$\vec{r}_{c_i}$--

Column 13, line 5: "$\hat{q}i$" should be --$\hat{q}_i$--

Column 13, line 5: "$\hat{q}k$" should be --$\hat{q}_k$--

Column 13, line 8: "$\hat{q}l$" should be --$\hat{q}_l$--

Column 13, line 8: "$\hat{q}j$" should be --$\hat{q}_j$--

Column 13, line 15: "$I_z$" should be --$I_2$--

Column 13, line 15: "In" should be --$I_n$--

Column 13, line 17: "$A = 1/2\left[\left|\hat{q}I1 \times \vec{q}I2\right| + \left|\vec{q}I2 \times \vec{q}I3\right| + \ldots \left|\vec{q}_{In} \times \vec{q}I1\right|\right]$"

should be

--$A = 1/2\left[\left|\hat{q}_{I_1} \times \vec{q}_{I_2}\right| + \left|\vec{q}_{I_1} \times \vec{q}_{I_3}\right| + \ldots \left|\vec{q}_{I_n} \times \vec{q}_{I_1}\right|\right]$--

Column 13, line 52: "diagrams" should be --diagram--

UNITED STATES PATENT AND TRADEMARK OFFICE
CERTIFICATE OF CORRECTION

PATENT NO. : 4,553,216

DATED : November 12, 1985

INVENTOR(S) : Glenn G. Stevens et al.

It is certified that error appears in the above-identified patent and that said Letters Patent is hereby corrected as shown below:

| | | |
|---|---|---|
| Column 15, (Claim 5, | line 19: line 1) | "liqud" should be --liquid-- |
| Column 15, | line 52: | "ot" should be --to-- |
| Column 15, (Claim 8, | line 54: line 1) | "1" should be --7-- |

Signed and Sealed this

First Day of April 1986

[SEAL]

Attest:

DONALD J. QUIGG

Attesting Officer

Commissioner of Patents and Trademarks